US012725924B2

(12) United States Patent
Moon et al.

(10) Patent No.: US 12,725,924 B2
(45) Date of Patent: Sep. 1, 2026

(54) RADIATION ELEMENT STRUCTURE

(71) Applicant: KMW INC., Hwaseong-si (KR)

(72) Inventors: Young Chan Moon, Suwon-si (KR); Sung Hwan So, Hwaseong-si (KR); Kwang Seok Choi, Osan-si (KR); Seong Man Kang, Hwaseong-Si (KR); Hun Jung Jung, Hwaseong-si (KR); Seung Han Son, Yongin-si (KR); Yong Sang Lee, Yongin-si (KR); Oh Seog Choi, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 39 days.

(21) Appl. No.: 18/900,594

(22) Filed: Sep. 27, 2024

(65) Prior Publication Data

US 2025/0023237 A1 Jan. 16, 2025

Related U.S. Application Data

(63) Continuation of application No. PCT/KR2023/004108, filed on Mar. 28, 2023.

(30) Foreign Application Priority Data

Apr. 6, 2022 (KR) ........................ 10-2022-0042829

(51) Int. Cl.
*H01Q 5/10* (2015.01)
*H01Q 1/48* (2006.01)
(Continued)

(52) U.S. Cl.
CPC ................. *H01Q 5/10* (2015.01); *H01Q 1/48* (2013.01); *H01Q 1/50* (2013.01); *H01Q 19/104* (2013.01)

(58) Field of Classification Search
CPC .. H01Q 5/10; H01Q 1/48; H01Q 1/50; H01Q 19/104
See application file for complete search history.

(56) References Cited

U.S. PATENT DOCUMENTS 9,722,323 B2 8/2017 Yona et al.
2019/0280377 A1 9/2019 Zhang et al.
(Continued)

FOREIGN PATENT DOCUMENTS

CN 104821427 A 8/2015
CN 111146576 A 5/2020
(Continued)

OTHER PUBLICATIONS

International Search Report mailed on Jul. 24, 2023 for International Application No. PCT/KR2023/004108 and its English translation.

(Continued)

*Primary Examiner* — Graham P Smith

(57) ABSTRACT

According to an embodiment of the present disclosure, provided is a radiation element structure arranged on a reflective plate, comprising: a radiation unit including a dielectric portion made from plastic material and first to fourth radiation arms arranged in a four-sided symmetrical structure on one surface of the dielectric portion; and a plurality of balun units, including a balun body connecting the reflective plate and the radiation unit, a feed line disposed on the upper surface of the balun body to feed the radiation unit, and a ground disposed on the lower surface of the balun body.

19 Claims, 6 Drawing Sheets

(51) Int. Cl.
*H01Q 1/50* (2006.01)
*H01Q 19/10* (2006.01)

(56) References Cited

U.S. PATENT DOCUMENTS

| | | | | |
|---|---|---|---|---|
| 2021/0305722 | A1* | 9/2021 | Zhang | H01Q 21/26 |
| 2022/0059929 | A1 | 2/2022 | Enkhbayar et al. | |

FOREIGN PATENT DOCUMENTS

| | | | |
|---|---|---|---|
| CN | 112635988 | A | 4/2021 |
| CN | 113131197 | A | 7/2021 |
| JP | 2002-084133 | A | 3/2002 |
| JP | 2013-026707 | A | 2/2013 |
| KR | 10-0865749 | B1 | 10/2008 |
| KR | 10-2017-0027678 | A | 3/2017 |
| KR | 10-2125803 | B1 | 6/2020 |

OTHER PUBLICATIONS

Office Action mailed on Sep. 24, 2025 from the Japanese Patent Office for Japanese Application No. 2024-556496 and its English translation.

The Extended European Search Report mailed on Mar. 5, 2026 from the European Patent Office for European Application No. 23784902.1.

* cited by examiner

RADIATION ELEMENT STRUCTURE

CROSS-REFERENCE TO RELATED APPLICATION

This application is a continuation of International Application No. PCT/KR2023/004108, filed on Mar. 28, 2023, which claims the priority benefit of Korean Patent Application No. 10-2022-0042829, filed in Korea on Apr. 6, 2022, the entire contents of which are incorporated herein by reference in their entirety.

TECHNICAL FIELD

The present disclosure relates to a radiation element structure.

BACKGROUND ART

The content described in this section simply provides background information for the present disclosure and does not constitute prior art.

Antennas, which are widely used in base stations and repeaters of mobile communication systems, are being researched to meet the demands for miniaturization and being light in weight. Multi-band antennas that can cover multiple bands and provide various services are becoming popular.

Massive MIMO (Multiple Input Multiple Output) technology is a technology that dramatically increases data transmission capacity by using multiple antennas. It is a spatial multiplexing technique where the transmitter uses each transmitting antenna to send different data, and the receiver uses appropriate signal processing to distinguish the transmitted data. Therefore, by simultaneously increasing the number of tranceiving antennas, the channel capacity increases, allowing more data to be transmitted.

The problem with using a multi-band antenna is that the high-band and low-band radiators affect each other, which degrades the radiation characteristics of the antenna.

Additionally, to realize a dual-polarized antenna capable of reducing the mutual influence of multiple radiating elements in a multi-band antenna, it is necessary to design the antenna considering the radiation performance, radiation characteristics, shape, size, manufacturing method, and ease of design of the radiating elements.

DETAILED DESCRIPTION OF INVENTION

Technical Problems

A radiation element structure according to an embodiment can minimize the influence of a plurality of radiation elements on one another in a multi-band antenna by minimizing the shape and volume of a radiation element.

The radiation element structure according to an embodiment can reduce the number of connection points in an antenna manufacturing process by using a plastic material.

The problems to be solved by the present disclosure are not limited to the aforementioned problems, and other problems not mentioned can be clearly understood by those skilled in the art from the description below.

Technical Solution

According to an embodiment of the present disclosure, there is provided a radiation element structure disposed on a reflector, the structure including: a radiation unit comprising a dielectric portion formed of a plastic material and first to fourth radiating arms disposed on one side of the dielectric portion in a four-sided symmetrical structure; and a plurality of balun units each comprising a balun body connecting the reflector and the radiation unit, a feed line disposed on an upper surface of the balun body to feed the radiation unit, and a ground disposed on a lower surface of the balun body.

Effect of Invention

According to one embodiment, the radiating element structure has the effect of stabilizing radiation characteristics of an antenna and facilitating the design of the antenna by minimizing the shape and volume of a radiating element.

According to one embodiment, the radiating element structure has the effect of increasing the structural stability of the antenna and enabling mass production of the antenna by reducing the number of connection points in a manufacturing process using a plastic material.

BEST MODE FOR CARRYING OUT THE INVENTION

Figure 1:
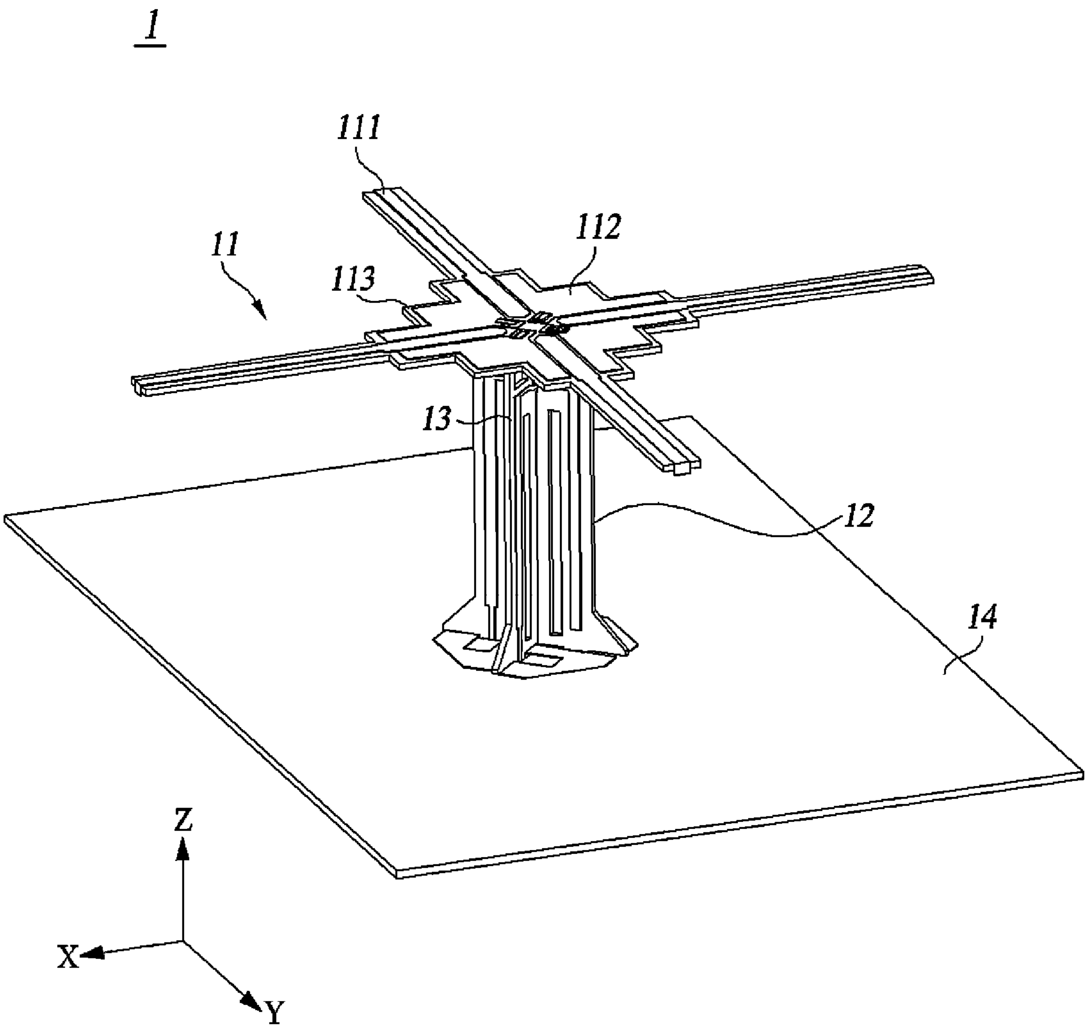
FIG. 1 is a combined perspective view of a radiation element structure according to an embodiment of the present disclosure.

Hereinafter, some embodiments of the present disclosure will be described in detail through illustrative drawings. When adding reference numerals to the components in each drawing, it should be noted that the same components are given the same numerals as much as possible, even if the components are shown in different drawings. Additionally, in describing the present disclosure, if it is determined that a detailed description of known functions and components unnecessarily obscure the gist of the present disclosure, the detailed description thereof will be omitted.

In describing the components of the embodiment according to the present disclosure, various terms such as first, second, i), ii), (a), (b), etc., may be used. These terms are used solely for the purpose of differentiating one component from the other, not to imply or suggest the substances, or the order or sequence of the components. Throughout the specification, when a part "includes" or "comprises" a component, the part is meant to further include, not exclude, other components unless there is a particular description contrary thereto.

FIG. 1 is a combined perspective view of a radiation element structure according to an embodiment of the present disclosure.

Figure 2:
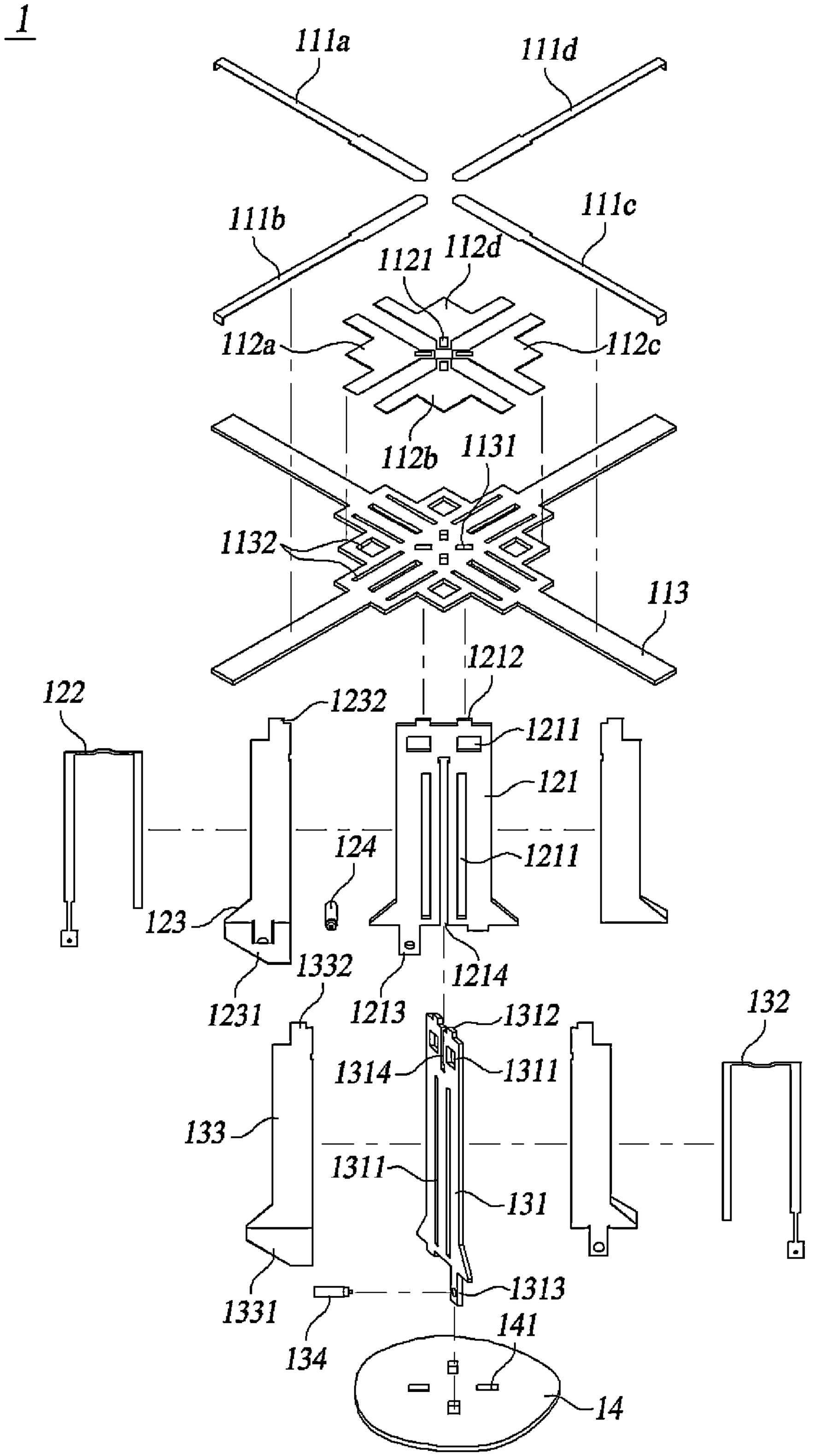
FIG. 2 is an exploded perspective view of a radiation element structure according to an embodiment of the present disclosure.

FIG. 2 is an exploded perspective view of a radiation element structure according to an embodiment of the present disclosure.

Referring to FIGS. 1 and 2, a radiation element structure of the present disclosure may include all or part of a radiation unit 11, a first balun unit 12, and a second balun unit 13. In addition, an antenna of the present disclosure may include all or part of the radiation element structure 1 and a reflector 14.

The radiation unit 11 may include all or part of a plurality of radiation arms 111, a plurality of sub-grounds 112, and a radiation plate 113.

The plurality of radiation arms 111 may be arranged on one surface of the radiation plate 113 in a four-sided symmetrical structure. The plurality of radiation arms 111 may be arranged at predetermined intervals on the same plane and may be arranged in an overall '+' shape. For example, based on a first radiation arm 111*a*, a second radiation arm 111*b* may be arranged perpendicularly to the first radiation arm 111*a*, a third radiation arm 111*c* may be arranged perpendicularly to the second radiation arm 111*b*, and a fourth radiation arm 111*d* may be arranged perpendicularly to the third radiation arm 111*c*.

The first radiation arm 111*a* and the third radiation arm 111*c* may be arranged in a line at a predetermined interval. The first radiation arm 111*a* and the third radiation arm 111*c* may be arranged in a first direction. At this point, the first direction may be a direction parallel to the Y-axis of FIG. 1. The second radiation arm 111*b* and the fourth radiation arm 111*d* may be arranged in a line at a predetermined interval. The second radiation arm 111*b* and the fourth radiation arm 111*d* may be arranged in a second direction perpendicular to the first direction. At this point, the second direction may be a direction parallel to the X-axis of FIG. 1.

The plurality of sub-grounds 112 may be arranged on one side of the radiation plate 113, and may each be disposed between adjacent radiation arms 111. For example, a first sub-ground 112*a* may be disposed between the first radiation arm 111*a* and the second radiation arm 111*b*. A second sub-ground 112*b* may be disposed between the second radiation arm 111*b* and the third radiation arm 111*c*. A third sub-ground 112*c* may be disposed between the third radiation arm 111*c* and the fourth radiation arm 111*d*. A fourth sub-ground 112*d* may be disposed between the fourth radiation arm 111*d* and the first radiation arm 111*a*.

The plurality of sub-grounds 112 may have a right-angled triangle shape and may be arranged so that right-angled portions are gathered at the center of the radiation plate 113. A first insertion groove 1121 may be formed at each right-angled end of the plurality of sub-grounds 112. A balun unit 12, 13 to be described later may be inserted into the first insertion groove 1121.

Each sub-ground 112 may have the shape of a right triangle, but at least part of the hypotenuse facing the right angle may be recessed. For example, each sub-ground 112 may have a staircase shape, but the shape of each sub-ground 112 of the present disclosure is not limited thereto. By having at least part of each sub-ground 112 recessed, it is possible to reduce the influence of the radiation unit 11 on other bands.

The radiation plate 113 may have a shape corresponding to the plurality of radiation arms 111 and the plurality of sub-grounds 112. The radiation plate 113 may be formed in a four-sided symmetrical structure and may be formed so that the plurality of radiation arms 111 and the plurality of sub-grounds 112 are all arranged on one side.

The radiation plate 113 may be formed of a dielectric material, for example, plastic. The radiation plate 113 may include a plurality of first grooves 1132. By forming the plurality of first grooves 1132 in the radiation plate 113, it is possible to reduce the weight of the radiation unit 11. In addition, by adjusting the dielectric constant of the radiating portion 11, it is possible to adjust radiation characteristics of the radiation element structure 1. By forming the radiation plate 113 of a plastic material, it is possible for the radiation element structure 1 of the present disclosure to ensure a high degree of freedom in materials and shapes. For example, unlike an element formed of a conventional PCB (e.g., FR4 material), the dielectric material may be removed even in areas where metal (e.g., radiation arms) is present.

The radiation plate 113 may include a plurality of second insertion grooves 1131. The second insertion grooves 1131 may be formed in the center of the radiation plate 113. The second insertion grooves 1131 may be formed to correspond to the first insertion grooves 1121 of the sub-grounds 112 so that the balun unit 12, 13, which will be described later, can be inserted into the second insertion grooves 1131.

The balun unit 12, 13 may include a first balun unit 12 and a second balun unit 13. Common characteristics related to the first balun unit 12 and the second balun unit 13 will be described together. The balun unit 12, 13 may connect the radiation unit 11 to the reflector 14. The balun unit 12, 13 may be connected perpendicularly to the radiation unit 11. The balun unit 12, 13 may be connected perpendicularly to the reflector 14.

The balun unit 12, 13 may be formed of a dielectric material, for example, plastic. The balun unit 12, 13 may include a plurality of second grooves 1211 and 1311. By forming the plurality of second grooves 1211 and 1311 in the balun unit 12, 13, it is possible to reduce the weight of the balun units 12 and 13. In addition, by adjusting the dielectric constant of the balun unit 12, 13, it is possible to adjust the frequency characteristics of the radiation element structure 1. For example, the required radiation or reception frequency may be adjusted. By forming the balun unit 12, 13 of plastic, it is possible for the radiation element structure 1 of the present disclosure to ensure a high degree of freedom in materials and shapes. For example, unlike an element formed of a conventional PCB, the dielectric material may be removed even in areas where metal (e.g., feed lines) is present.

The balun unit 12, 13 may include a balun body 121, 131, a feed line 122, 132, a ground 123, 133, and a connect port 124, 134.

The balun body 121, 131 may include a second groove 1211, 1311, a first protrusion 1212, 1312, a connection part 1213, 1313, and a slit 1214, 1314. The balun body 121, 131 is formed of plastic, and the balun body 121, 131, the second groove 1211, 1311, the first protrusion 1212, 1312, the connection part 1213, 1313, and the slit 1214, 1314 may be integrally formed.

The first protrusion 1212, 1312 may be formed at one end of the balun body 121, 131 in the Z-axis direction (towards the radiation unit). The first protrusion 1212, 1312 may be inserted into the second insertion groove 1131 of the radiation plate 113 and the first insertion groove 1121 of the sub-ground 112. The first protrusion 1212, 1312 may be sequentially inserted into the second insertion groove 1131 and the first insertion groove 1121 to connect the balun unit 12, 13 and the radiation unit 11.

The connection part 1213, 1313 may be formed at the other end of the balun body 121, 131 in the Z-axis direction (toward the reflector). The connection part 1213, 1313 may be inserted into the third insertion groove 141 of the reflector 14. The connection part 1213, 1313 may be inserted into the third insertion groove 141 to connect the balun unit 12, 13 and the reflector 14.

The first balun unit 12 may include a first balun body 121, and the first balun body 121 may include a first slit 1214. The second balun unit 13 includes a second balun body 131, and the second balun body 131 may include a second slit 1314. The first balun unit 12 and the second balun unit 13 may be coupled perpendicularly to each other. The first slit 1214 may be formed at a lower end of the first balun unit 12 (towards the reflector), and the second slit 1314 may be formed at an upper end of the second balun unit 13 (towards the radiation unit). As the first slit 1214 is inserted into the second slit 1314, the first balun unit 12 and the second balun unit 13 may be coupled perpendicularly to each other.

The first balun unit 12 may be coupled perpendicularly to the radiation unit 11, so that a width direction of the first balun unit 12 faces the third direction. Here, the third direction is a direction parallel to a line that bisects the angle between the first radiation arm 111*a* and the second radiation arm 111*b*.

The second balun unit 13 may be coupled perpendicularly to the radiation unit 11, so that a width direction of the second balun unit 13 faces the fourth direction which is perpendicular to the third direction. Here, the fourth direction is a direction parallel to a line that bisects the angle between the second radiation arm 111*b* and the third radiation arm 111*c*. However, the present disclosure is not limited thereto, and the width directions of the first balun unit 12 and the second balun unit 13 may be at a predetermined angle relative to a longitudinal direction of the radiation arms 111.

The feed line 122, 132 may be disposed on an upper surface of the balun body 121, 131. Here, the upper surface refers to a direction on which the feed line 122, 132 is disposed among the two surfaces of the balun body 121, 131. Disposed on the upper surface of the balun body 121, 131, the feed line 122, 132 may be configured to feed a plurality of radiation arms 111. The feed line 122, 132 may feed the plurality of radiation arms 111 in a coupling method. However, the present disclosure is not limited thereto, and the feed line 122, 132 may be directly connected to the plurality of radiation arms 111. The plurality of radiation arms 111 may transmit and receive signals or receive power using the feed line 122, 132.

The first balun unit 12 may include a first feed line 122, and the second balun unit 13 may include a second feed line 132. The first feed line 122 may be formed in a 'L' shape. For example, the first feed line 122 may extend in a longitudinal direction of the first balun unit 12 (Z-axis direction), then be bent in the third direction, and then bent again in the longitudinal direction of the first balun unit 12 (Z-axis direction). The second feed line 132 may be formed in a '⊏' shape. For example, the second feed line 132 may extend in a longitudinal direction of the second balun unit 13 (Z-axis direction), then be bent in the fourth direction, and then bent again in the longitudinal direction of the second balun unit 13 (Z-axis direction). That is, the first feed line 122 and the second feed line 132 may intersect each other perpendicularly.

The first feed line 122 and the second feed line 132 may receive feed signals from separate signal sources, respectively. The first feed line 122 may receive a feed signal using a first connection port 124, and the second feed line 132 may receive a feed signal using a second connection port 134. The feed into the first feed line 122 and the second feed line 132 may be provided using a coaxial cable. The connection port 124, 134 may be connected to an RF circuit equipped with a filter, a power amplifier, a power supply unit, etc.

Since the first feed line 122 extends along the third direction, the first feed line 122 may collectively feed the first radiation arm 111*a* and the second radiation arm 111*b*, and may also collectively feed the third radiation arm 111*c* and the fourth radiation arm 111*d*. Since the second feed line 132 extends along the fourth direction, the second feed line 132 may collectively feed the second radiation arm 111*b* and the third radiation arm 111*c*, and may also collectively feed the first radiation arm 111*a* and the fourth radiation arm 111*d*. The first feed line 122 and the second feed line 132 may feed the plurality of radiation arms 111 in a capacitance coupling method.

The ground 123, 133 may include a bent part 1231, 1331 and a second protrusion 1232, 1332. The second protrusion 1232, 1332 may be formed at one end (toward the radiation unit) of the ground 123, 133 in the Z-axis direction. The second protrusion 1232, 1332 may be inserted into the second insertion grooves 1131 of the radiation plate 113 and the first insertion grooves 1121 of the sub-grounds 112. The second protrusion 1212, 1312 may be sequentially inserted into the second insertion grooves 1131 and the first insertion grooves 1121 to connect the balun unit 12, 13 and the radiation unit 11.

The ground 123, 133 may be soldered to the sub-ground 112. An end of the second protrusion 1212, 1312 is soldered to the sub-ground 112, thereby connecting the balun unit 12, 13 and the radiation unit 11.

The bent part 1231, 1331 may be formed at the other end (toward the reflector) of the ground 123, 133 in the Z-axis direction. The bent part 1231, 1331 may be formed by bending the other end of the grounds 123, 133. The bent parts 1231, 1331 may be bent to be parallel to the reflector 14.

With the bent part 1231, 1331 of the ground 123, 133 being parallel to the reflector 14, the balun unit 12, 13 and the reflector 14 may be easily connected in the radiation element structure 1 of the present disclosure. By using the bent part 1231, 1331, the balun unit 12, 13 and the reflector 14 may be connected without any additional component, unlike an element formed of a conventional PCB. Therefore, the radiation element structure 1 of the present disclosure increases structural stability by reducing the number of connection points in a manufacturing process and facilitates mass production. The balun unit 12, 13 and the reflector 14 may be connected in a direct connection method and/or a coupling connection methods.

Figure 3:
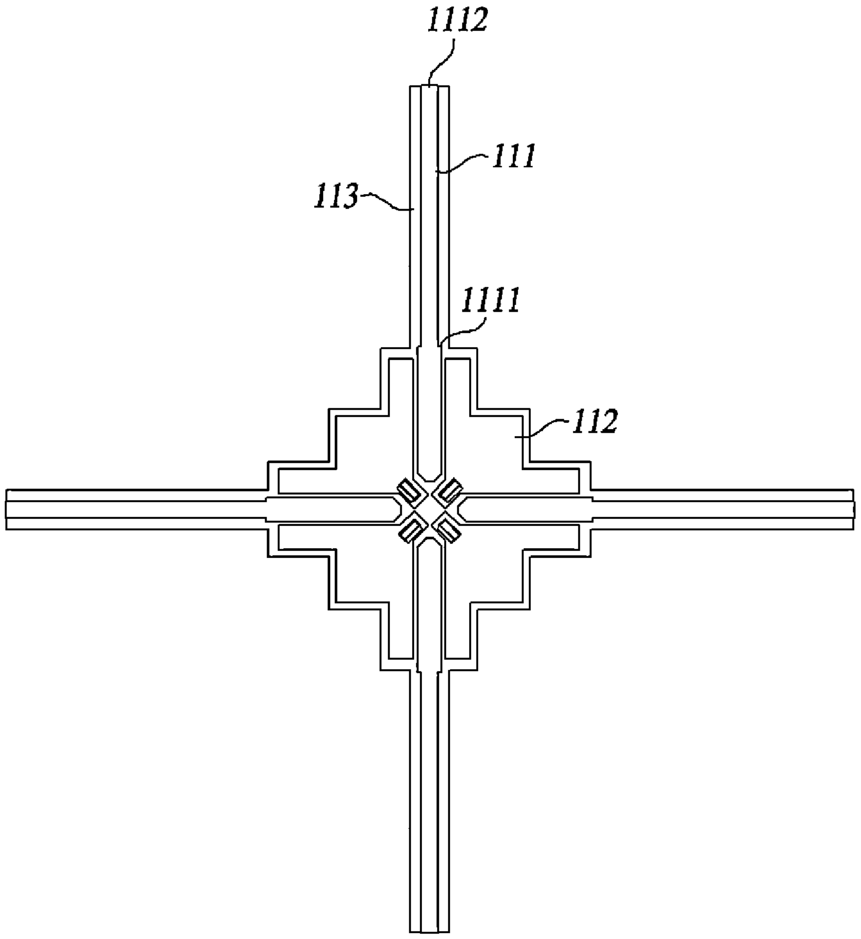
FIG. 3 is a top view of a radiation element structure according to an embodiment of the present disclosure.

FIG. 3 is a top view of a radiation element structure according to an embodiment of the present disclosure.

Referring to FIG. 3, a plurality of radiation arms 111 may each include a step 1111. At least a portion of each radiation arm 111 along a longitudinal direction may include the step 1111 with a non-uniform width. Here, the longitudinal direction of each radiation arm 111 refers to a direction from the center of a radiation plate 113 toward an end portion 1112 of a corresponding radiation arm 111. That is, each radiation arm 111 may have a multi-stage structure where a width (in a direction perpendicular to the longitudinal direction) is not uniform. As each radiation arm 111 is formed with a multi-stage structure, it is possible to reduce the influence of the radiation unit 11 on other frequency bands.

The length of each radiation arm 111 may be 1/4 of the wavelength (lambda) of the operating frequency. Thus, the total length of two radiation arms located on the same axis may be 1/2 lambda. For example, a sum of the lengths of the first radiation arm 111*a* and the third radiation arm 111*c* located in the first direction may be 1/2 lambda, and a sum of the lengths of the second radiation arm 111*b* and the fourth radiation arm 111*d* located in the second direction may be 1/2 lambda.

Figure 4:
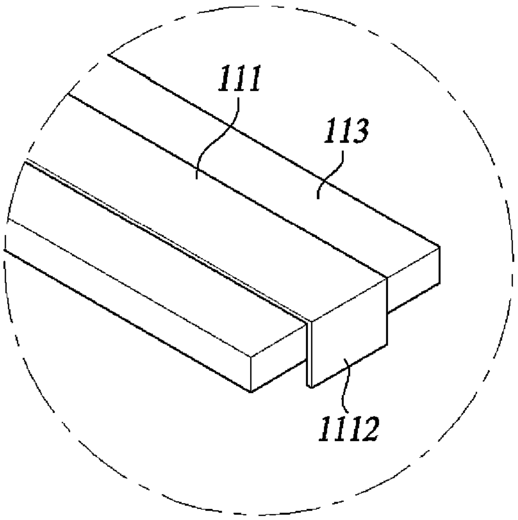
FIG. 4 is an enlarged view of an end portion of the radiation arm of a radiation element structure according to an embodiment of the present disclosure.

FIG. 4 is an enlarged view of an end portion of the radiation arm of a radiation element structure according to an embodiment of the present disclosure.

Referring to FIG. 4, each end portion 1112 of a plurality of radiation arms 111 may be bent. Each end portion 1112 may be bent in a direction parallel to the Z-axis. Each end portion 1112 may be bent in a direction parallel to the Z-axis, but may be bent in a direction toward the reflector 14. However, the bending direction and angle of the end portion 1112 are not limited thereto and may be set in various ways as needed. As the end portion 1112 of each radiation arm 111 is bent, the length of each radiation arm 111 is reduced, and consequently, it is possible to reduce the influence of the radiation unit 11 on other frequency bands.

In addition, by bending the end portion 1112 of each radiation arm 111, it is possible to three-dimensionally implement the shape of the radiation unit 11 without any additional component, unlike an element formed of a conventional PCB.

Figure 5:
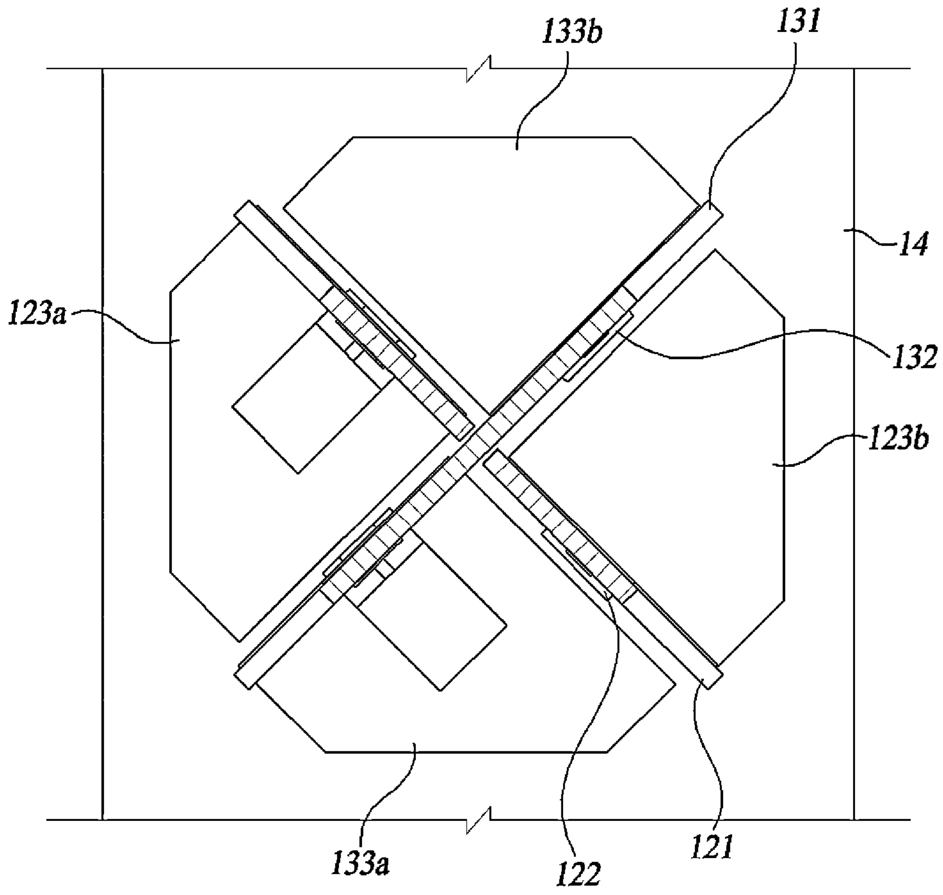
FIG. 5 is a cross-sectional view of a radiation element structure according to an embodiment of the present disclosure cut in a plane perpendicular to the Z-axis.

FIG. 5 is a cross-sectional view of a radiation element structure according to an embodiment of the present disclosure cut in a plane perpendicular to the Z-axis.

Figure 6:
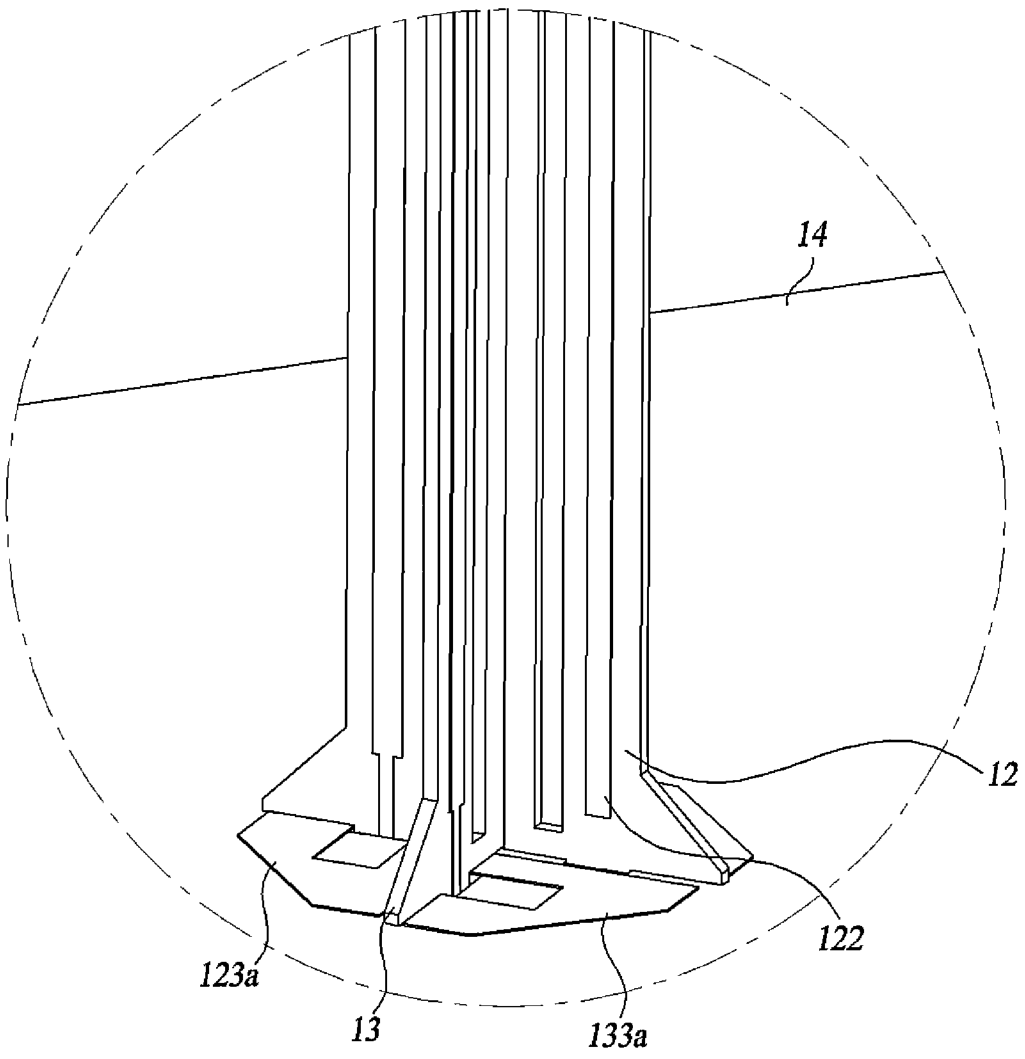
FIG. 6 is an enlarged view of a balun unit of the radiation element structure according to an embodiment of the present disclosure.

FIG. 6 is an enlarged view of a balun unit of the radiation element structure according to an embodiment of the present disclosure.

Referring to FIGS. 5 and 6, a ground 123, 133 of a balun unit 12, 13 may include a first ground 123*a*, 133*a* and a second ground 123*b*, 133*b*. The first ground 123*a*, 133*a* and the second ground 123*b*, 133*b* may all be arranged at a lower surface of the balun unit 12, 13. Here, the lower surface refers to a surface of the balun body 121, 131, where a feed line 122, 132 is not disposed.

The first ground 123*a*, 133*a* may be disposed at the lower surface of the balun unit 12, 13, with a bent part 1231, 1331 facing towards an upper surface of the balun unit 12, 13. On the other hand, the second ground 123*b*, 133*b* may be disposed at the lower surface of the balun unit 12, 13, with the bent part 1231, 1331 facing toward the lower surface of the balun unit 12, 13.

Each bent part 1231 of a first balun unit 12 may be disposed parallel to a third direction, but may be disposed to face opposite directions. Each bent part 1331 of a second balun unit 13 may be disposed parallel to a fourth direction, but may be disposed to face opposite directions. Therefore, structural stability may be increased when connecting the balun unit 12, 13 and the reflector 14.

The above description is merely illustrative of the technical concepts of the present embodiment, and those skilled in the art to which the present embodiment pertains will appreciate that various modifications, changes, and alterations can be made without departing from the essential characteristics of the present embodiment. Accordingly, the embodiments are illustrative and not intended to limit the technical ideas of the present disclosure, and the scope of the technical ideas of the present disclosure is not limited by these embodiments. The scope of the present disclosure shall be construed in accordance with the following claims, and all technical ideas within the scope of the equivalents shall be construed to be included within the scope of the present disclosure.

DESCRIPTION OF REFERENCE NUMERALS

1: radiation element structure
11: radiation unit
12: first balun unit
13: second balun unit
14: reflector

What is claimed is:

1. A radiation element structure disposed on a reflector, the structure comprising:
- a radiation unit comprising a dielectric portion formed of a plastic material and first to fourth radiating arms disposed on one side of the dielectric portion in a four-sided symmetrical structure; and
- a plurality of balun units each comprising a balun body connecting the reflector and the radiation unit, a feed line disposed on an upper surface of the balun body to feed the radiation unit, and a ground disposed on a lower surface of the balun body,
- wherein one end of each of the first to fourth radiation arms is bent toward the reflector.

2. The radiation element structure of claim 1,
- wherein the first to fourth radiation arms are arranged on the same plane,
- wherein the second radiation arm is perpendicular to the first radiation arm,
- wherein the third radiation arm is perpendicular to the second radiation arm, and
- wherein the fourth radiation arm is disposed perpendicular to the third radiation arm.

3. The radiation element structure of claim 1, wherein, in the first to fourth radiation arms, at least a portion along a longitudinal direction is formed in a multi-stage structure.

4. A radiation element structure disposed on a reflector, the structure comprising:
- a radiation unit comprising a dielectric portion formed of a plastic material and first to fourth radiating arms disposed on one side of the dielectric portion in a four-sided symmetrical structure; and
- a plurality of balun units each comprising a balun body connecting the reflector and the radiation unit, a feed line disposed on an upper surface of the balun body to feed the radiation unit, and a ground disposed on a lower surface of the balun body,
- wherein the radiation unit further comprises a plurality of sub-grounds each disposed between adjacent radiation arms, and
- wherein the sub-grounds are each connected to the ground.

5. The radiation element structure of claim 4, wherein the sub-grounds are each formed in a step shape.

6. The radiation element structure of claim 1, wherein the balun unit comprises a first balun unit having a first feed line, and a second balun unit perpendicularly intersecting the first balun unit and having a second feed line.

7. The radiation element structure of claim 6, wherein a width direction of the first balun unit and the second balun unit forms a predetermined angle relative to the longitudinal direction of the radiation arms.

8. The radiation element structure of claim 6, wherein the first feed line and the second feed line receive feeding signals from different signal sources.

9. The radiation element structure of claim 6, wherein the first feed line collectively feed the first radiation arm and the second radiation arm disposed perpendicularly to the first radiation arm.

10. The radiation element structure of claim 6, wherein the second feed line collectively feed the second radiation arm and the third radiation arm disposed perpendicularly to the second radiation arm.

11. The radiation element structure of claim 4, wherein the ground comprises a protrusion protruding in Z-axis direction at one end, and a bent part bent to be parallel to the reflector at the other end.

12. The radiation element structure of claim 11, wherein the protrusion is soldered to the sub-ground by soldering.

13. The radiation element structure of claim 11, wherein the bending part is coupled to with the reflector.

14. The radiation element structure of claim 1, wherein the dielectric portion comprises one or more grooves arranged at predetermined intervals.

15. The radiation element structure of claim 1, wherein the balun body is formed of a plastic material and comprises one or more grooves.

16. The radiation element structure of claim 1, wherein the radiating part and the balun unit are perpendicularly coupled to each other.

17. An antenna comprising:

a reflector;

a radiation unit comprising a dielectric portion formed of a plastic material, first to fourth radiating arms disposed on one surface of the dielectric portion, and a plurality of sub-grounds respectively disposed between adjacent radiating arms in a four-sided symmetrical structure; and a plurality of balun units each comprising a balun body connecting the reflector and the radiation unit, a feed line disposed on an upper surface of the balun body to feed the radiation unit, and a ground disposed on a lower surface of the balun body and connected to a corresponding one of the sub-grounds.

18. The antenna of claim 17, wherein one end of each of the first to fourth radiation arm is bent toward the reflector.

19. The antenna of claim 17, wherein the balun unit comprises a first balun unit having a first feed line, and a second balun unit perpendicularly intersecting the first balun unit and having a second feed line.

* * * * *